United States Patent
Madan et al.

(10) Patent No.: US 10,909,327 B2
(45) Date of Patent: Feb. 2, 2021

(54) UNSUPERVISED LEARNING OF INTERPRETABLE CONVERSATION MODELS FROM CONVERSATION LOGS

(71) Applicant: International Business Machines Corporation, Armonk, NY (US)

(72) Inventors: Dhiraj Madan, New Delhi (IN); Pankaj Dhoolia, New Delhi (IN); Dinesh Raghu, New Delhi (IN); Gaurav Pandey, New Delhi (IN); Sachindra Joshi, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 16/111,774

(22) Filed: Aug. 24, 2018

(65) Prior Publication Data

US 2020/0066255 A1    Feb. 27, 2020

(51) Int. Cl.

| | |
|---|---|
| *G06F 40/35* | (2020.01) |
| *G10L 15/06* | (2013.01) |
| *G06N 3/08* | (2006.01) |
| *G10L 15/197* | (2013.01) |
| *G10L 15/18* | (2013.01) |
| *G06N 3/04* | (2006.01) |

(52) U.S. Cl.
CPC ........... *G06F 40/35* (2020.01); *G06N 3/0445* (2013.01); *G06N 3/088* (2013.01); *G10L 15/063* (2013.01); *G10L 15/1815* (2013.01); *G10L 15/197* (2013.01)

(58) Field of Classification Search
CPC ............................... G06F 40/35; G10L 15/063
See application file for complete search history.

(56) References Cited

U.S. PATENT DOCUMENTS

| | | | |
|---|---|---|---|
| 9,972,307 B2 | 5/2018 | Stent et al. | |
| 10,395,641 B2 | 8/2019 | Dhoolia et al. | |
| 2015/0228275 A1* | 8/2015 | Watanabe | G10L 15/142 704/275 |

(Continued)

OTHER PUBLICATIONS

U.S. Appl. No. 16/239,070, filed Jan. 3, 2019.

(Continued)

*Primary Examiner* — Shaun Roberts
(74) *Attorney, Agent, or Firm* — Ryan, Mason & Lewis, LLP (57) ABSTRACT

Methods, systems, and computer program products for unsupervised learning of interpretable conversation models from conversation logs are provided herein. A computer-implemented method includes obtaining human-to-human conversation logs; training a deep learning model by (i) learning, in an unsupervised manner, semantic labels for dialog contexts in the multiple human-to-human conversation logs, (ii) mapping the learned semantic labels to query responses across the multiple human-to-human conversation logs, and (iii) inferring one or more entities from the multiple conversation logs based at least in part on the mapping; constructing a human-interpretable conversation model based at least in part on patterns determined via the trained deep learning model; and outputting the human-interpretable conversation model to at least one user.

14 Claims, 8 Drawing Sheets

(56) References Cited

U.S. PATENT DOCUMENTS

| | | | | |
|---|---|---|---|---|
| 2015/0365527 A1* | 12/2015 | Chakravarthy | ....... | H04M 3/493 |
| | | | | 455/411 |
| 2017/0180294 A1* | 6/2017 | Milligan | ................ | H04L 51/16 |
| 2017/0213546 A1 | 7/2017 | Gilbert et al. | | |
| 2018/0053119 A1* | 2/2018 | Zeng | ...................... | G06N 20/00 |
| 2018/0060301 A1* | 3/2018 | Li | ......................... | G06F 40/35 |
| 2018/0329998 A1* | 11/2018 | Thomson | .......... | H04N 21/4668 |

OTHER PUBLICATIONS

Liu et al., Iterative Policy Learning in End-To-End Trainable Task-Oriented Neural Dialog Models, Cornell University Library, arXiv.org; Sep. 18, 2017.

Serban et al., Multiresolution Recurrent Neural Networks: An Application to Dialogue Response Generation, Cornell Library University, arxiv.org; Jun. 14, 2016.

\* cited by examiner

UNSUPERVISED LEARNING OF INTERPRETABLE CONVERSATION MODELS FROM CONVERSATION LOGS

FIELD

The present application generally relates to information technology, and, more particularly, to language processing techniques.

BACKGROUND

Existing dialog frameworks allow a designer to build a chatbot (that is, a computer program or other software which is capable of carrying out conversational communications via auditory and/or textual processes) as a finite state machine. Such a system generally includes intents, entities, and dialog nodes, wherein each intent is a class of user utterances, and each dialog node is a state in the finite state machine. Based on the user utterance received and the current dialog node, the system decides whether to move to a next and/or new dialog node. However, the entirety of such systems needs to be manually designed, which can be time-consuming, labor-intensive and error-prone.

Existing systems and methods that attempt to learn interpretable conversation models are typically constrained by a limited ability to learn from merely one conversation at a time. Consequently, such approaches commonly result in mistakes during the learning process, which makes expert verification of the learning process necessary. Additionally, other existing approaches include models that are not interpretable or extendable by humans and/or are constrained in terms of model creation speed.

SUMMARY

In one embodiment of the present invention, techniques for unsupervised learning of interpretable conversation models from conversation logs are provided. An exemplary computer-implemented method can include obtaining multiple human-to-human conversation logs, and training a deep learning model by (i) learning, in an unsupervised manner, semantic labels for dialog contexts in the multiple human-to-human conversation logs, (ii) mapping the learned semantic labels to query responses across the multiple human-to-human conversation logs, and (iii) inferring one or more entities from the multiple conversation logs based at least in part on the mapping. The method can also include constructing a human-interpretable conversation model based at least in part on one or more patterns determined via the trained deep learning model, and outputting the human-interpretable conversation model to at least one user.

In another embodiment of the invention, an exemplary computer-implemented method can include training a deep learning model by additionally learning probabilities of transitioning between two or more of the mapped semantic labels based on one or more user utterances. Further, such a method can also include outputting the constructed human-interpretable conversation model to at least one natural language understanding model.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes unsupervised learning of interpretable conversation models from conversation logs. At least one embodiment of the invention includes training an interpretable dialog model (which includes intents, entities, and dialog-flow conversation engines) by applying unsupervised learning to human-to-human conversation logs. Such an embodiment includes obtaining user/human conversation logs (that is, interaction logs between the user and a human agent) and learning semantic labels for dialog contexts associating each dialog edge of user utterance as an intent. When it is determined, for example, that a semantic label z' follows a semantic label z and a user utterance u, an edge can be created between them. The edge is then labelled by all such utterances which lead one from z' to z. The collection of these utterances is then referred to as defining an intent, and the utterances are examples for such an intent.

Accordingly, and as further detailed herein, one or more embodiments of the invention includes using deep learning (DL) to define probability distributions, $P(Y_i|Z_i)$, the probability of generating the $i^{th}$ response ($Y_i$) given the $i^{th}$ semantic label ($Z_i$), and $P(Z_i|Z_{i-1}, x_i)$, the probability of transitioning to the next dialog state ($Z_i$), given the previous dialog state ($Z_{i-1}$) and new user utterance ($X_i$). Subsequently, such an embodiment includes, using the distributions trained from a DL model, defining dialog edges and, consequently, one or more intents.

Additionally, such an embodiment can also include inferring each entity from the edges based on the compared conversation logs. Also, one or more embodiments of the invention can include detecting a common response pattern of the user to specific queries and constructing a human interpretable conversation model for training/enriching an interpretable dialog model (which includes intents, entities, and dialog-flow conversation engines) using unsupervised learning system. For example, at least one embodiment of the invention includes generating and implementing a deep learning method to learn an interpretable conversation system with discrete states and probability distributions for transitioning between the states, as well as generating one or more responses given a particular state. A discrete state is a class label, and, in accordance with one or more embodiments of the invention, a model learns to associate semantics to these labels through the Expectation Maximization (EM) approach. As used herein, the terms "semantic labels" and "discrete states" can be used synonymously.

At least one embodiment of the invention includes learning and utilizing a new (that is, not previously existing) set of semantic labels. As used herein, a semantic label corresponds to a class of contexts or the sequential history of utterances in a conversation until a given utterance time step. Semantic labels can correspond to a dialog node. As an example of a semantic label, consider nodes 402, 404 and 406 in FIG. 4.

Additionally, one or more embodiments of the invention can include learning and implementing a new model for a dialog manager; that is, a mapping of the new set of semantic labels to new system responses appropriate for the semantic labels, as well as for the flow of conversation from one semantic label to the next. The flow of conversation can represent, for example, the order of occurrence of semantic labels to expect and allow. Further, one or more embodiments of the invention can include breaking down the semantic label into notions of intent and entity, as well as combining conditional expressions on the semantic labels. The conditional expressions can refer to the Boolean expressions on intents and entities which are used to decide when to move to a dialog node.

Accordingly, at least one embodiment of the invention includes learning probabilities of transitioning between discrete states as well as learning corresponding responses in an unsupervised manner (that is, responses corresponding to the discrete states which represent dialog nodes and/or conversation context). Such actions enable a transformation of an existing model to human interpretable dialog forms (that human users and/or dialog designers can then understand and/or modify).

Figure 1:
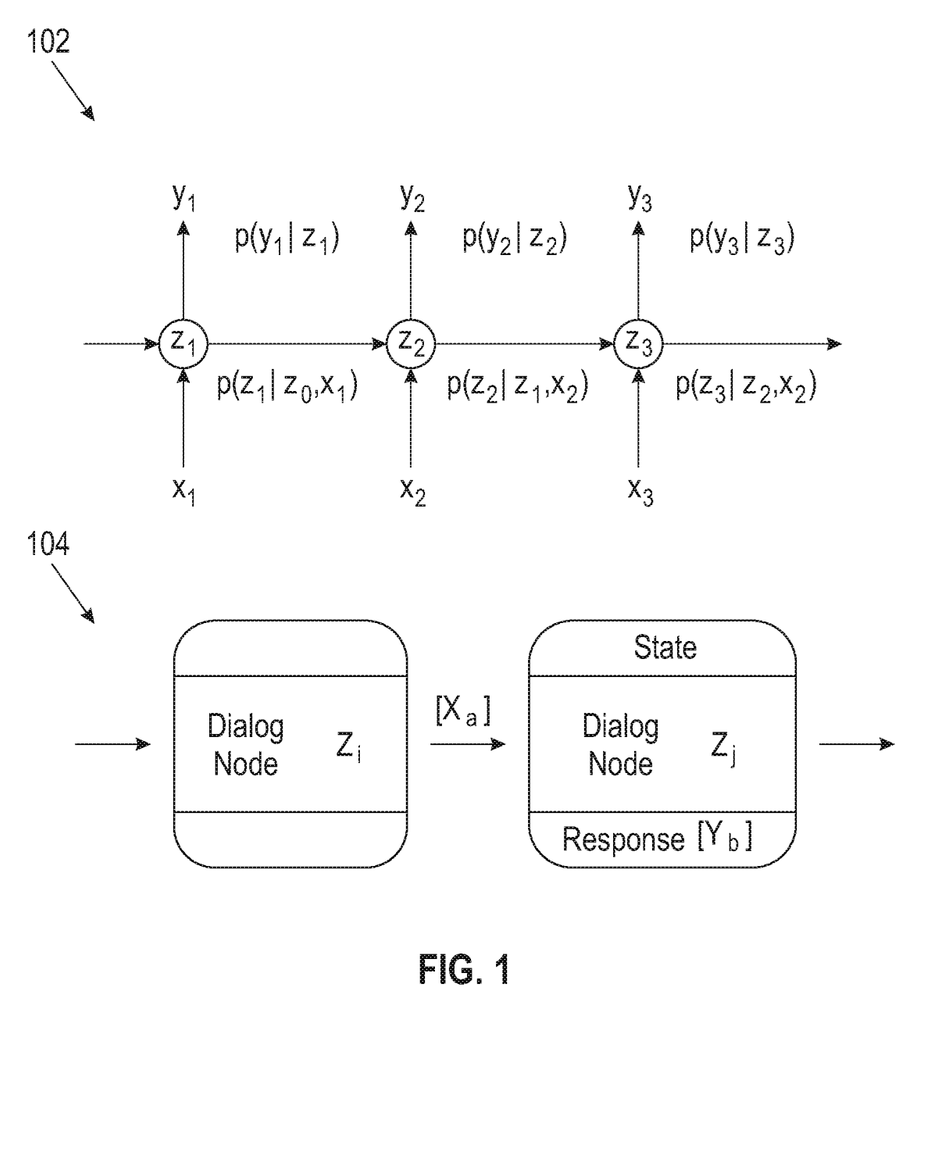
FIG. 1 is a diagram illustrating a deep learning model and a mapping to an interpretable model, according to an exemplary embodiment of the invention.

FIG. 1 is a diagram illustrating a deep learning model and a mapping to an interpretable model, according to an exemplary embodiment of the invention. By way of illustration, FIG. 1 depicts a deep learning model 102 and its intuitive mapping to an interpretable model 104. In the deep learning model 102, a discrete latent variable Z is used for intuitively mapping to the probable dialog-states (or dialog-nodes) in the dialog-flow of an interpretable conversation model 104.

In conjunction with the illustrated example in FIG. 1, $X_i$ represents the $i^{th}$ turn input, and $Y_i$ refers to the $i^{th}$ turn output. Additionally, at least one embodiment of the invention includes implementing multiple probability distributions in connection with the ultimate model. For example, $P(Y_i|Z_i)$ represents the probability of response $Y_i$ corresponding to dialog state $Z_i$. That is, this emission distribution indicates the probability of generating the response $Y_i$, given that the model is in state $Z_i$. This intuitively maps the dialog state to the likely responses. Additionally, $P(Z_i|Z_{i-1}, X_i)$ represents the probability of a dialog state $Z_i$ given the previous dialog state, and a new utterance (which intuitively models the flow between dialog states). That is, this transition distribution indicates, given that the model is in state $Z_{i-1}$, if the user utters $X_i$ what the probability is that it will move to state $Z_i$.

Also, in one or more embodiments of the invention, both of the above-noted distributions are parametrized using neural networks. For the transition distribution, the neural network takes the user utterance $X_i$ and the previous state $Z_{i-1}$ as input. The neural network generates the probability of each next state as output, and the number of states is fixed beforehand. For the emission distribution, the neural network takes the current state $Z_i$ as input, and the neural network generates the probability of response $Y_i$ as output.

Figure 2:
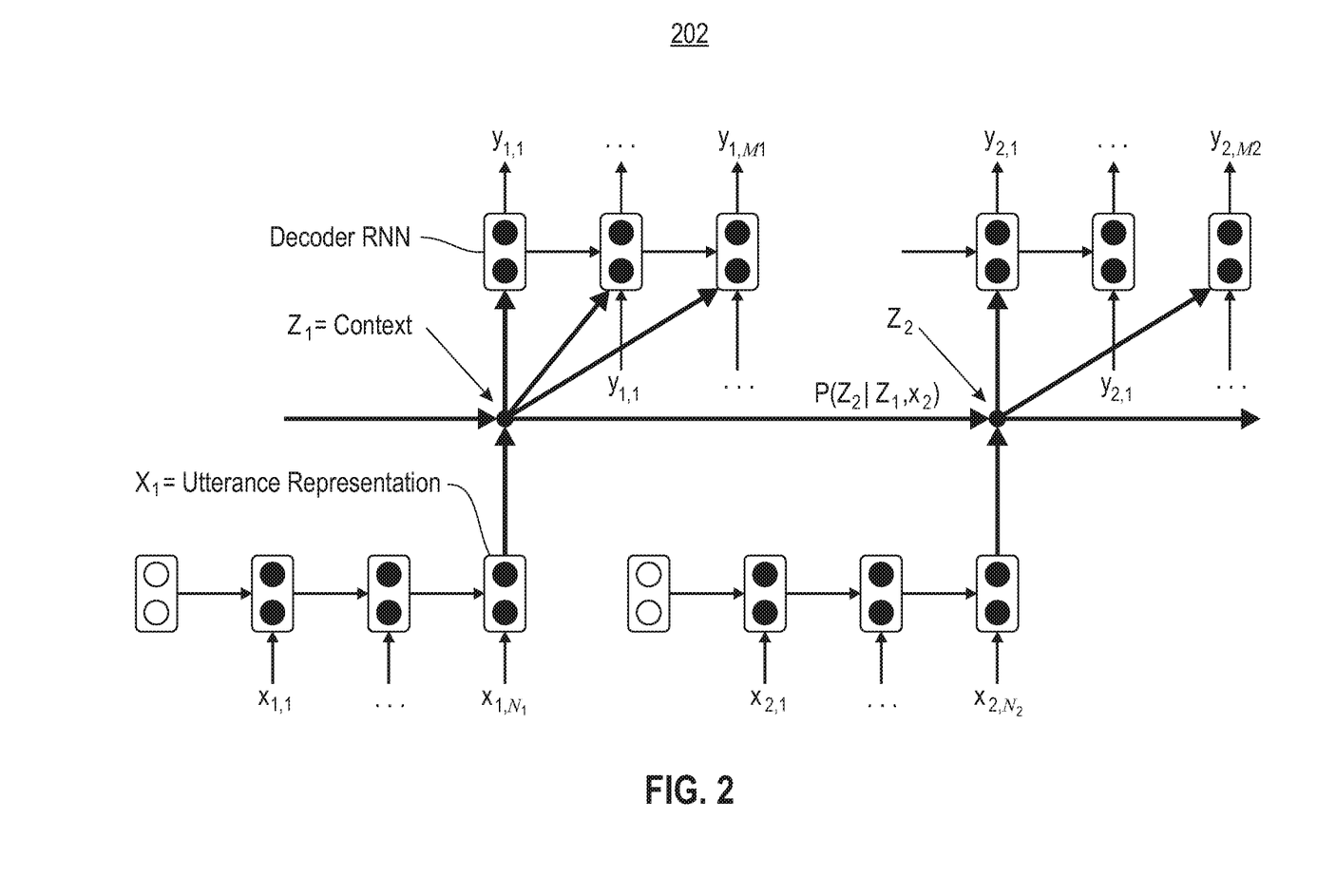
FIG. 2 is a diagram illustrating an example instantiation of a model through a deep learning network, according to an exemplary embodiment of the invention.

FIG. 2 is a diagram illustrating an example instantiation of a model 202 through deep learning network, according to an exemplary embodiment of the invention. Specifically, FIG. 2 is a graphical description of the deep learning architecture 202 which is trained in accordance with one or more embodiments of the invention. The utterance representation is obtained through an encoder recurrent neural network (RNN), and the representation is used to condition the distribution $P(Z_i|z_{i-1}, X_i)$. The decoder RNN is then used to generate the response token-by-token.

Figure 3:
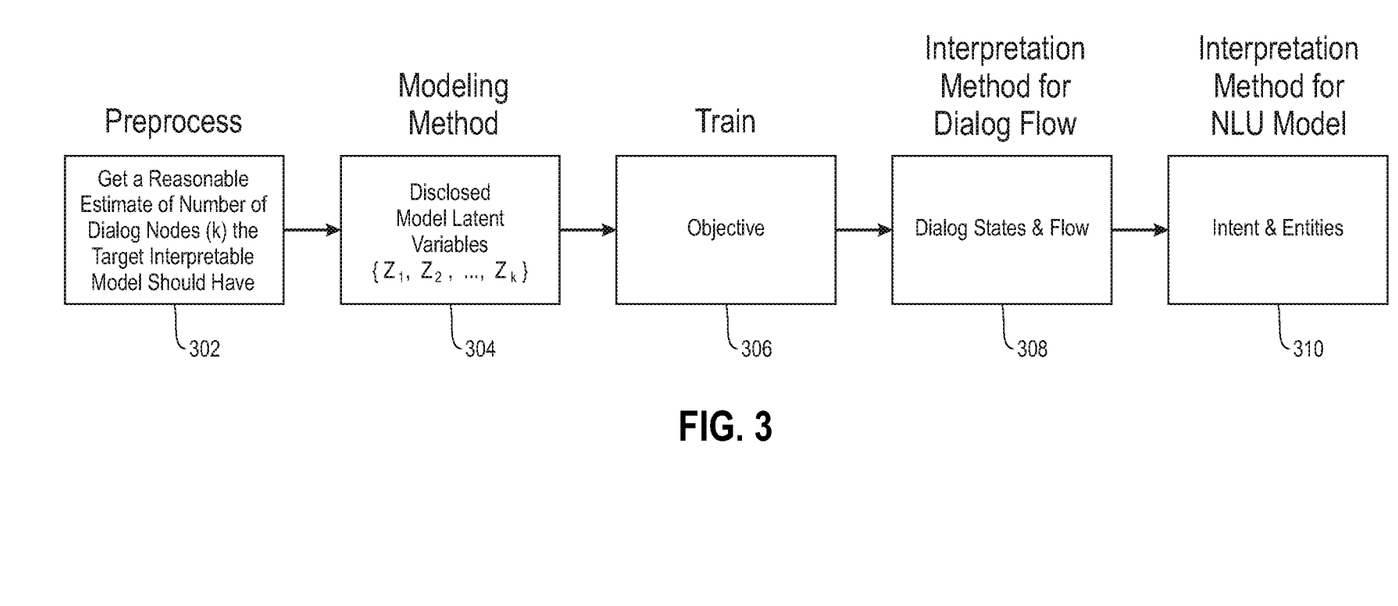
FIG. 3 is a flow diagram illustrating techniques according to an embodiment of the invention.

FIG. 3 is a flow diagram illustrating techniques according to an embodiment of the invention. By way of illustration, FIG. 3 depicts a pre-processing step 302, a modeling method step 304, a training step 306, an interpretation method for dialog flow step 308, and an interpretation method for a natural language understanding (NLU) model step 310. The pre-processing step 302 includes obtaining a reasonable estimate of the number of dialog nodes (k) that the target interpretable model should contain. For example, such a step can include using clustering of $Y_i$ to determine an optimal number of clusters.

The modeling method 304 step includes utilizing disclosed model latent variables $\{Z_1, Z_2, \ldots, Z_k\}$. One or more embodiments of the invention include denoting the tokens of user utterance $X_i$ by $\{W^X_{i,1}, W^X_{i,2}, \ldots, W^X_{i,N}\}$, and that of agent response $Y_i$ by $\{W^Y_{i,1}, W^Y_{i,2}, \ldots, W^Y_{i,M}\}$. By way of example, model 102 in FIG. 1 defines the following: $P(Z_1, \ldots Z_N, Y_1, \ldots Y_N|X_1, \ldots X_N) = \Pi P(Z_i|Z_{i-1}, X_i) * P(Y_i|Z_i)$. This equation describes the factoring assumption on given probability distribution. This is equivalent to assuming that: (a) the last state and the current utterance are sufficient to determine the new state independent of all other utterances; and (b) the current discrete state is sufficient to generate the response independent of the past history.

Training step 306 considers a parameterized instantiation of the above-noted distributions using a deep learning model (as depicted FIG. 2). One or more embodiments of the invention includes training parameters to maximize the following: $\log(P(Z_1, \ldots Z_N, Y_1, \ldots Y_N|X_1, \ldots X_N)$. Though the distribution $P(Z_1, \ldots Z_N, Y_1, \ldots Y_N|X_1, \ldots X_N)$ is defined, directly maximizing its log likelihood is non-trivial because Z's are not observed in the training data. Instead, the marginal over $Z_i$, which is $\log(\Sigma_{Z_1\ Z_2\ \ldots\ Z_n} \Pi P(Z_i|Z_{i-1}X_i)*P(Y_i|Z_i))$, can be maximized. In at least one embodiment of the invention, it is assumed that there are parameterized instantiations of transition distributions $P(Z_i|Z_{i-1},X_i)$ and emission distributions $P(Y_i|Z_i)$.

Using the above, one or more embodiments of the invention include defining factored distribution as follows: $P(Z_1, \ldots Z_N, Y_1, \ldots Y_N|X_1, \ldots X_N)=\Pi P(Z_i|Z_{i-1},X_i)*P(Y_i|Z_i)$. Additionally, such an embodiment can include defining an objective function as $\log(P(Y_1, \ldots Y_N|X_1, \ldots X_N)) = \log(\Sigma_{Z1\ Z2\ \ldots\ Zn} \Pi P(Z_i|Z_{i-1},X_i)*P(Y_i|Z_i))$, which can be maximized over the training data. Also, at least one embodiment of the invention can include using an expectation maximization technique to maximize the above. To make the expectation (E) and maximization (M) steps tractable, such an embodiment can include using the Viterbi algorithm to compute the posterior and to obtain the expected cost under the same.

In connection with the interpretation method for dialog flow step 308, based on probability distribution $P(Y_i|Z_i)$, at least one embodiment of the invention includes populating responses for all $\{Z_1, Z_2, \ldots, Z_k\}$. Based on probability distribution $P(Z_i|Z_{i-1},X_i)$, such an embodiment can include creating edges between $\{Z_1, Z_2, \ldots, Z_k\}$, and for edges created, associating the $X_i$ with corresponding edges. Further, in connection with the interpretation method for NLU model 310, $X_i$ is associated with the edges created between $\{Z_1, Z_2, \ldots, Z_k\}$, causing dialog state transitions. Accordingly, such edges, together with the response of the target node, uniquely represent the dialog state of the target node. A dialog state in the interpretable domain is conditioned on intent and the one or more entities related thereto. As detailed herein, one or more embodiments of the invention includes using a set of methods to auto-extract intents and entities.

At least one embodiment of the invention includes utilizing a combined understanding pattern method. Such a pattern method does not distinguish between intent and entity, but it extracts a combined understanding model as a classifier (such as intents, for example). The steps involved can include treating each edge as an intent, with the $X_i$ associated with that edge as its examples. Additionally, distances between these edge clusters are evaluated to determine if there are any edge clusters that can be merged. Such clusters include collections of all utterances which label an edge from one node to another node.

Additionally, one or more embodiments of the invention can include utilizing an entity copy pattern method. It is common for users and/or experts to copy important parts of a previous utterance in their responses. Further, when such a copy is part-of-speech (POS) tagged as a noun or noun-phrase, then the likelihood of the copy being an entity is increased. Carrying out such a pattern method includes comparing all $X_i(s)$ on an incoming edge into a $Z_i$ with the responses in $Z_i$, and the copied tokens and/or phrases in the response (POS tagged nouns) are inferred to be entities. Additionally, such a pattern method includes comparing $X_i(s)$ on all outgoing edges from a $Z_i$ with the responses in $Z_i$, and the copied tokens and/or phrases in the $X_i(s)$ (POS tagged nouns) are inferred to be entities.

Another method includes using the emission distribution model $P(Y_i|Z_i, X_i)$ instead of $P(Y_i|Z_i)$. $P(Y_i|Z_i, X_i)$ allows for checking if certain tokens in response to a specific latent variable $Z_i$ come directly from input, in which case, determining whether they have a corresponding entity. Further, one or more embodiments of the invention include determining a first intent and then one or more entities for disambiguation.

Figure 4:
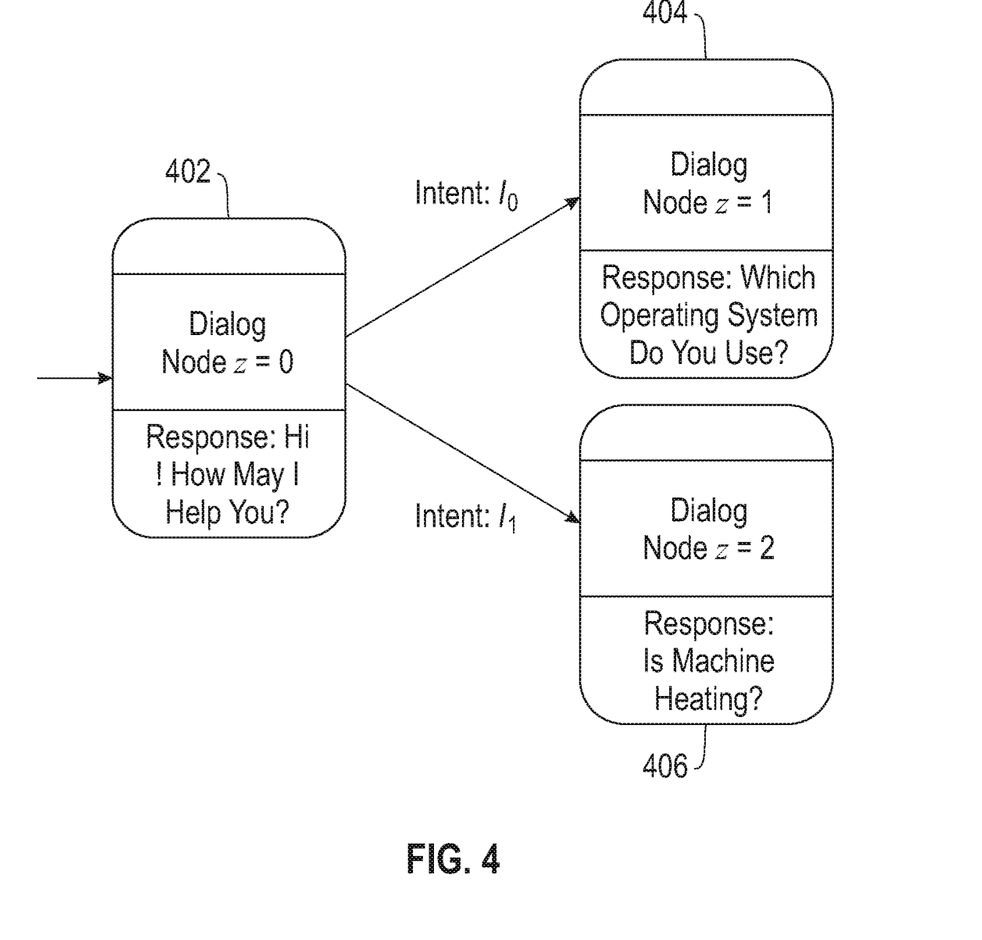
FIG. 4 is a diagram illustrating a desired intents and dialog flow, according to an exemplary embodiment of the invention.

FIG. 4 is a diagram illustrating a desired intents and dialog flow, according to an exemplary embodiment of the invention. Specifically, FIG. 4 represents an instance of IBM® Watson™ Assistant. By way of illustration, FIG. 4 depicts dialog node 402 (z=0), dialog node 404 (z=1) and dialog node 406 (z=2). As illustrated, dialog node 402 (having a response of "Hi! How may I help you?") provides a first intent ($I_0$) to dialog node 404 (having a response of "Which operating system do you use?"), and provides a second intent ($I_1$) to dialog node 406 (having a response of "Is machine heating?"). Intent $I_0$ (email_not_opening) can include, for example, "I am unable to start notes email," and/or "Unable to start my email client." Additionally, intent $I_1$ (#machine_reboot) can include "My system keep getting rebooted," and/or "My machine is booting again."

Figure 5:
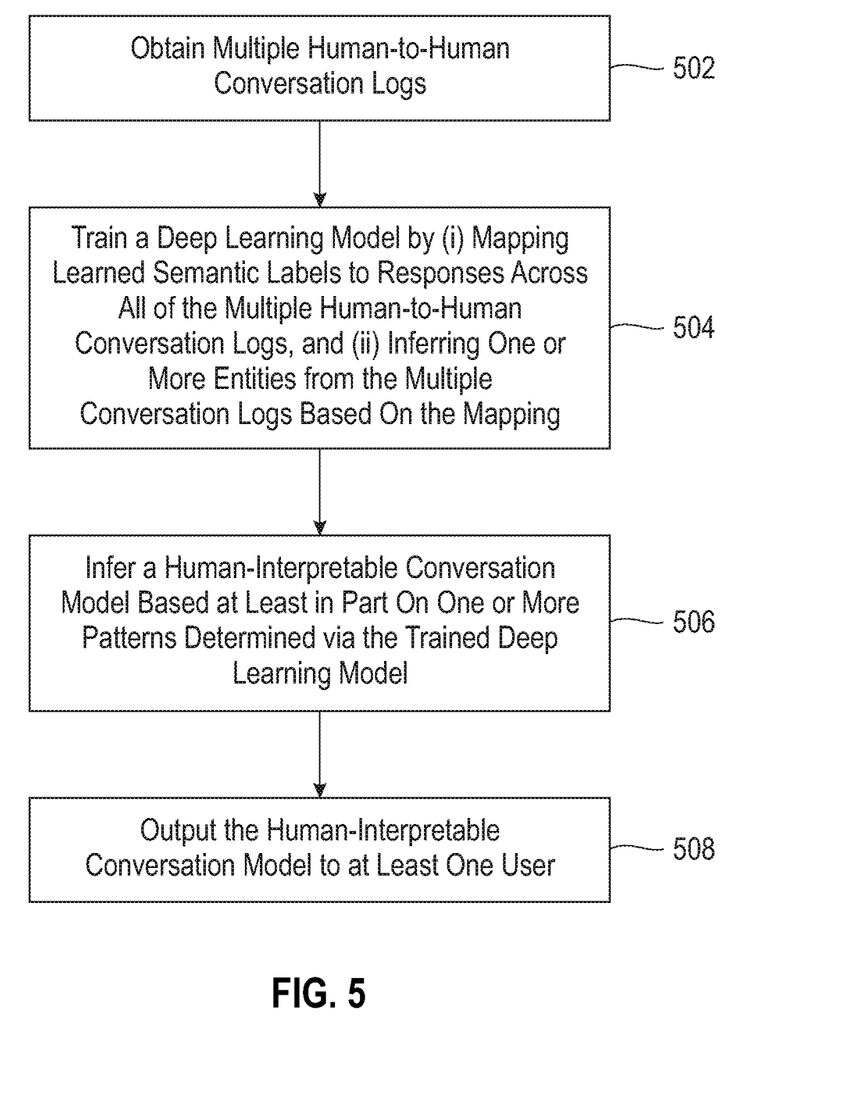
FIG. 5 is a flow diagram illustrating techniques according to an embodiment of the invention.

FIG. 5 is a flow diagram illustrating techniques according to an embodiment of the present invention. Step 502 includes obtaining multiple human-to-human conversation logs. Step 504 includes training a deep learning model by (i) learning, in an unsupervised manner, semantic labels for dialog contexts in the multiple human-to-human conversation logs, (ii) mapping the learned semantic labels to query responses across the multiple human-to-human conversation logs, and (iii) inferring one or more entities from the multiple conversation logs based at least in part on the mapping. The semantic labels can include, for example, one or more intents. Training the deep learning model can include determining probability distributions for transitioning between instances of the learned semantic labels. Additionally, training the deep learning model can include generating one or more query responses given an instance of a particular one of the learned semantic labels.

Step 506 includes constructing a human-interpretable conversation model based at least in part on one or more patterns determined via the trained deep learning model. The human-interpretable conversation model can include (i) multiple intents, (ii) multiple entities, and (iii) one or more conversation flows. Also, the conversation flows can include an estimation of one or more ordered instances of occurrences of multiple semantic labels in a conversation. Additionally, constructing can include constructing the human-interpretable conversation model in an unsupervised manner, as well as learning one or more probabilities of transitioning between one or more instances of mapped semantic labels.

Step 508 includes outputting the human-interpretable conversation model to at least one user.

Also, an additional embodiment of the invention includes training a deep learning model by additionally learning probabilities of transitioning between two or more of the mapped semantic labels based on one or more user utterances. Further, such a method can also include outputting the constructed human-interpretable conversation model to at least one natural language understanding model.

The techniques depicted in FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 6:
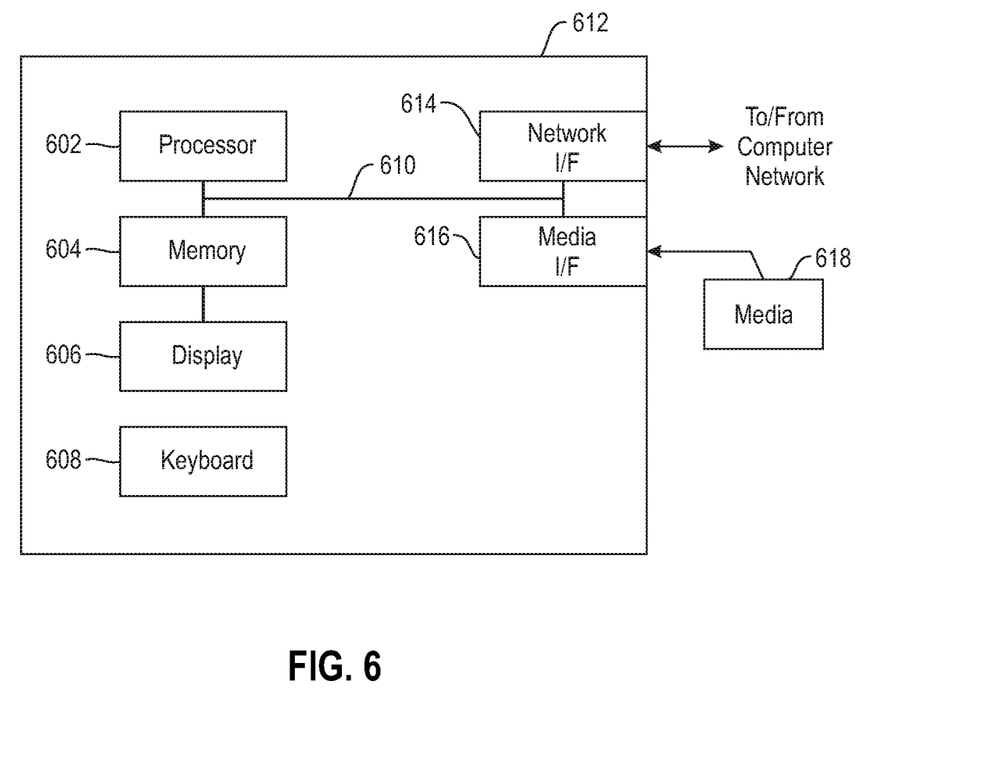
FIG. 6 is a system diagram of an exemplary computer system on which at least one embodiment of the invention can be implemented.

Additionally, an embodiment of the present invention can make use of software running on a computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
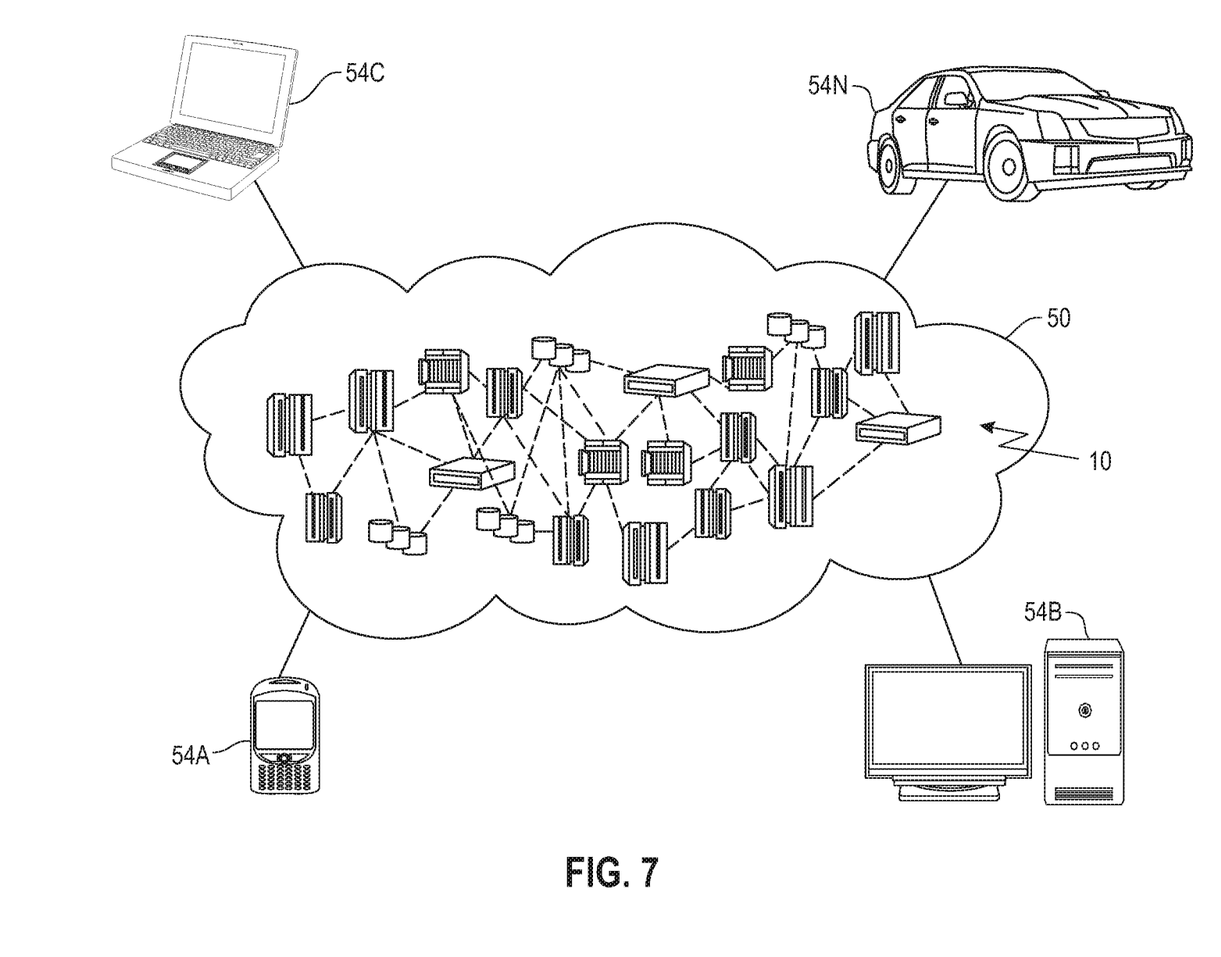
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
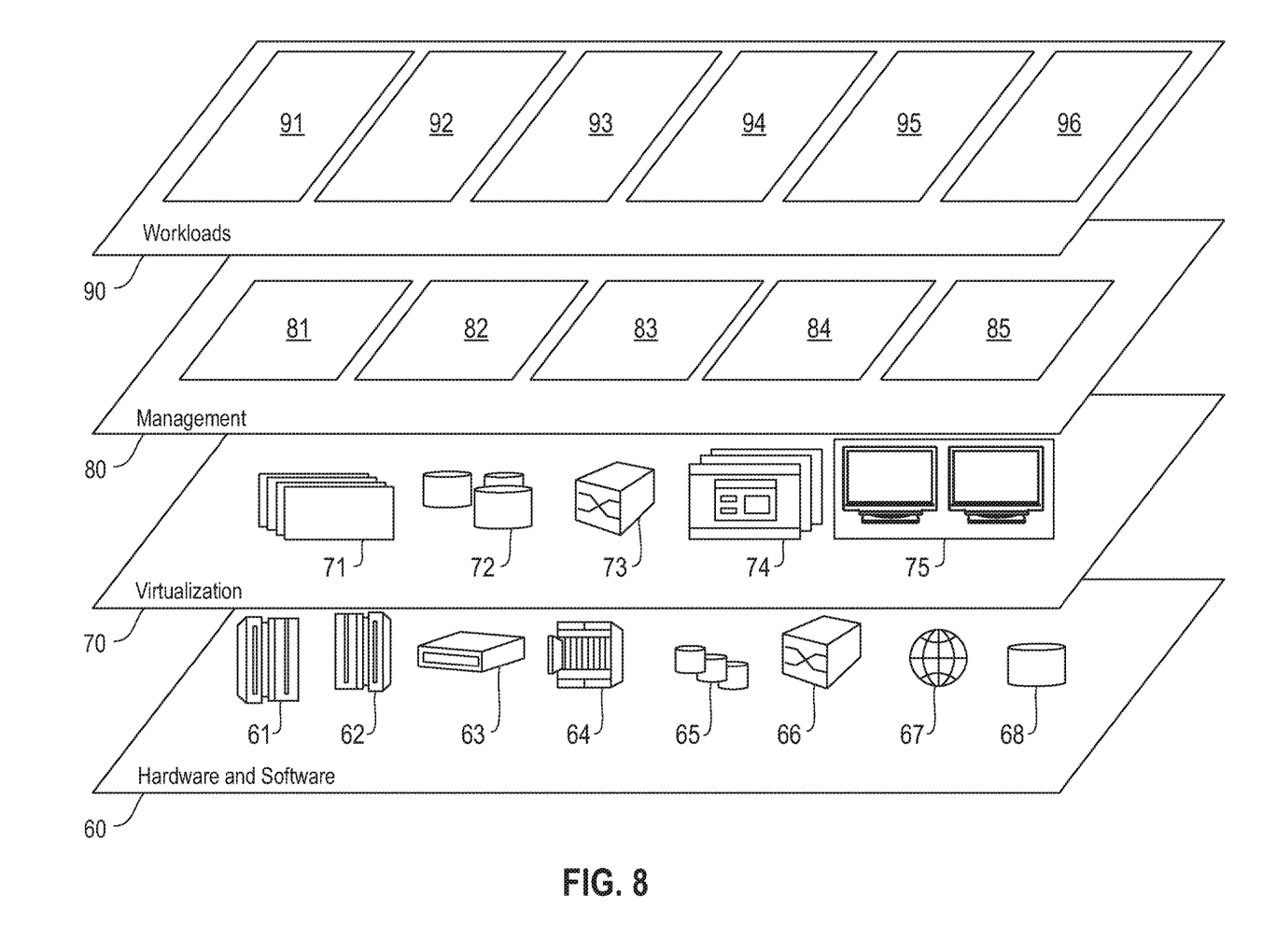
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and interpretable dialog model training 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, dynamically associating dialog edges of human responses as intent and comparing collected dialog edges with historical utterances of the user to infer entities.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
   obtaining multiple human-to-human conversation logs;
   training a deep learning model by (i) learning, in an unsupervised manner, semantic labels for dialog contexts in the multiple human-to-human conversation logs, (ii) mapping the learned semantic labels to query responses across the multiple human-to-human conversation logs, and (iii) inferring one or more entities from the multiple conversation logs based at least in part on the mapping, wherein said training the deep learning model comprises
      determining a transition probability distribution indicating a probability of the deep learning model transitioning to a second given state from a first given state in response to a given user utterance; and
      determining an emission probability distribution indicating a probability of the deep learning model generating a given response provided that the deep learning model is in a given state;
      wherein the transition probability distribution and the emission probability distribution are parameterized using one or more neural networks;
   constructing a human-interpretable conversation model based at least in part on (i) one or more patterns determined via the trained deep learning model and (ii) the transition probability distribution and the emission probability distribution determined in connection with the trained deep learning model; and
   outputting the human-interpretable conversation model to at least one user;
   wherein the method is carried out by at least one computing device.

2. The computer-implemented method of claim 1, wherein the semantic labels comprise one or more intents.

3. The computer-implemented method of claim 1, wherein said training the deep learning model comprises generating one or more query responses given an instance of a particular one of the learned semantic labels.

4. The computer-implemented method of claim 1, wherein the human-interpretable conversation model comprises (i) multiple intents, (ii) multiple entities, and (iii) one or more conversation flows.

5. The computer-implemented method of claim 4, wherein the one or more conversation flows comprises an estimation of one or more ordered instances of occurrences of multiple semantic labels in a conversation.

6. The computer-implemented method of claim 1, wherein said constructing comprises constructing the human-interpretable conversation model in an unsupervised manner.

7. A computer program product comprising a computer readable storage medium having program instructions embodied therewith, the program instructions executable by a computing device to cause the computing device to:
   obtain multiple human-to-human conversation logs;
   train a deep learning model by (i) learning, in an unsupervised manner, semantic labels for dialog contexts in the multiple human-to-human conversation logs, (ii) mapping the learned semantic labels to query responses across the multiple human-to-human conversation logs, and (iii) inferring one or more entities from the multiple conversation logs based at least in part on the mapping, wherein said training the deep learning model comprises
      determining a transition probability distribution indicating a probability of the deep learning model transitioning to a second given state from a first given state in response to a given user utterance; and
      determining an emission probability distribution indicating a probability of the deep learning model generating a given response provided that the deep learning model is in a given state;
      wherein the transition probability distribution and the emission probability distribution are parameterized using one or more neural networks;
   construct a human-interpretable conversation model based at least in part on (i) one or more patterns determined via the trained deep learning model and (ii) the transition probability distribution and the emission probability distribution determined in connection with the trained deep learning model; and
   output the human-interpretable conversation model to at least one user.

8. The computer program product of claim 7, wherein said training the deep learning model comprises generating one or more query responses given an instance of a particular one of the learned semantic labels.

9. The computer program product of claim 7, wherein the human-interpretable conversation model comprises (i) multiple intents, (ii) multiple entities, and (iii) one or more conversation flows.

10. The computer program product of claim 9, wherein the one or more conversation flows comprises an estimation of one or more ordered instances of occurrences of multiple semantic labels in a conversation.

11. The computer program product of claim 7, wherein said constructing comprises constructing the human-interpretable conversation model in an unsupervised manner.

12. The computer program product of claim 7, wherein the semantic labels comprise one or more intents.

13. A system comprising:
   a memory; and
   at least one processor operably coupled to the memory and configured for:

obtaining multiple human-to-human conversation logs;
training a deep learning model by (i) learning, in an unsupervised manner, semantic labels for dialog contexts in the multiple human-to-human conversation logs, (ii) mapping the learned semantic labels to query responses across the multiple human-to-human conversation logs, and (iii) inferring one or more entities from the multiple conversation logs based at least in part on the mapping, wherein said training the deep learning model comprises
   determining a transition probability distribution indicating a probability of the deep learning model transitioning to a second given state from a first given state in response to a given user utterance; and
   determining an emission probability distribution indicating a probability of the deep learning model generating a given response provided that the deep learning model is in a given state;
   wherein the transition probability distribution and the emission probability distribution are parameterized using one or more neural networks;
constructing a human-interpretable conversation model based at least in part on (i) one or more patterns determined via the trained deep learning model and (ii) the transition probability distribution and the emission probability distribution determined in connection with the trained deep learning model; and
outputting the human-interpretable conversation model to at least one user.

14. A computer-implemented method, the method comprising:
obtaining multiple human-to-human conversation logs;
training a deep learning model by (i) learning, in an unsupervised manner, semantic labels for dialog contexts in the multiple human-to-human conversation logs, (ii) mapping the learned semantic labels to query responses across the multiple human-to-human conversation logs, and (iii) inferring one or more entities from the multiple conversation logs based at least in part on the mapping, wherein said training the deep learning model comprises
   determining a transition probability distribution indicating a probability of the deep learning model transitioning to a second given state from a first given state in response to a given user utterance; and
   determining an emission probability distribution indicating a probability of the deep learning model generating a given response provided that the deep learning model is in a given state;
   wherein the transition probability distribution and the emission probability distribution are parameterized using one or more neural networks;
constructing a human-interpretable conversation model based at least in part on one or more patterns determined via the trained deep learning model; and
outputting the human-interpretable conversation model to at least one natural language understanding model;
wherein the method is carried out by at least one computing device.

\* \* \* \* \*